United States Patent
Crothers et al.

(10) Patent No.: US 9,151,502 B2
(45) Date of Patent: *Oct. 6, 2015

(54) SYSTEM AND METHOD FOR REDUCING MODAL COUPLING OF COMBUSTION DYNAMICS

(71) Applicant: General Electric Company, Schenectady, NY (US)

(72) Inventors: Sarah Lori Crothers, Greenville, SC (US); Gilbert Otto Kraemer, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/048,272

(22) Filed: Oct. 8, 2013

(65) Prior Publication Data

US 2014/0109587 A1    Apr. 24, 2014

Related U.S. Application Data

(63) Continuation-in-part of application No. 14/048,252, filed on Oct. 8, 2013, which is a continuation of application No. 13/590,302, filed on Aug. 21, 2012, and a continuation of application No. 13/590,309, filed on Aug. 21, 2012.

(51) Int. Cl.
| | |
|---|---|
| *F23R 3/20* | (2006.01) |
| *F23R 3/46* | (2006.01) |
| *F02C 7/24* | (2006.01) |
| *F02C 7/22* | (2006.01) |
| *F23D 14/02* | (2006.01) |
| *F23R 3/28* | (2006.01) |

(52) U.S. Cl.
CPC ... *F23R 3/20* (2013.01); *F02C 7/22* (2013.01); *F02C 7/24* (2013.01); *F23D 14/02* (2013.01); *F23R 3/286* (2013.01); *F23R 3/46* (2013.01); *F23R 2900/00014* (2013.01)

(58) Field of Classification Search
CPC .......... F05B 2260/96; F05B 2260/964; F23D 2210/00; F23D 2210/101
USPC ........ 60/725, 737, 740, 742, 746, 748, 39.37, 60/39.77
See application file for complete search history.

(56) References Cited

U.S. PATENT DOCUMENTS

| | | | |
|---|---|---|---|
| 5,943,866 A | 8/1999 | Lovett et al. | |
| 6,164,055 A * | 12/2000 | Lovett et al. | 60/776 |
| 7,578,130 B1 | 8/2009 | Kraemer et al. | |
| 2003/0037549 A1* | 2/2003 | Mandai et al. | 60/746 |
| 2011/0179795 A1* | 7/2011 | Johnson et al. | 60/725 |
| 2014/0053528 A1* | 2/2014 | Crothers et al. | 60/39.37 |
| 2014/0109587 A1* | 4/2014 | Crothers et al. | 60/776 |
| 2014/0245738 A1* | 9/2014 | Crothers et al. | 60/725 |

* cited by examiner

*Primary Examiner* — Phutthiwat Wongwian
*Assistant Examiner* — Marc Amar
(74) *Attorney, Agent, or Firm* — Charlotte C. Wilson; Ernest G. Cusick; Frank A. Landgraff

(57) ABSTRACT

A system and method for reducing combustion dynamics includes first and second combustors, and each combustor includes a fuel nozzle and a combustion chamber downstream from the fuel nozzle. Each fuel nozzle includes an axially extending center body, a shroud that circumferentially surrounds at least a portion of the axially extending center body, a plurality of vanes that extend radially between the center body and the shroud, a first fuel port through at least one of the plurality of vanes at a first axial distance from the combustion chamber, the plurality of vanes being located at a second axial distance from the combustion chamber. A second fuel port is provided through the center body at a third axial distance from the combustion chamber. The system further includes structure for producing a combustion instability frequency in the first combustor that is different from the combustion instability frequency in the second combustor.

15 Claims, 12 Drawing Sheets

SYSTEM AND METHOD FOR REDUCING MODAL COUPLING OF COMBUSTION DYNAMICS

CROSS-REFERENCE TO RELATED APPLICATIONS

The present application is a continuation-in-part application of (GE-241695-1) U.S. patent application Ser. No. 14/048,252, filed Oct. 8, 2013, which is a continuation application of U.S. patent application Ser. No. 13/590,302 and U.S. patent application Ser. No. 13/590,309, both of which were filed on Aug. 21, 2012, the disclosures of which are hereby incorporated by reference herein in their entirety.

TECHNICAL FIELD

The present invention generally involves a system and method for reducing modal coupling of combustion dynamics. In particular embodiments, the invention may be incorporated into a gas turbine or other turbo-machine.

BACKGROUND

Combustors are commonly used in industrial and commercial operations to ignite fuel to produce combustion gases having a high temperature and pressure. For example, gas turbines and other turbo-machines typically include one or more combustors to generate power or thrust. A typical gas turbine used to generate electrical power includes an axial compressor at the front, multiple combustors around the middle, and a turbine at the rear. Ambient air enters the compressor as a working fluid, and the compressor progressively imparts kinetic energy to the working fluid to produce a compressed working fluid at a highly energized state. The compressed working fluid exits the compressor and flows through one or more fuel nozzles and/or tubes in the combustors where the compressed working fluid mixes with fuel before igniting to generate combustion gases having a high temperature and pressure. The combustion gases flow to the turbine where they expand to produce work. For example, expansion of the combustion gases in the turbine may rotate a shaft connected to a generator to produce electricity.

Various factors influence the design and operation of the combustors. For example, higher combustion gas temperatures generally improve the thermodynamic efficiency of the combustors. However, higher combustion gas temperatures may also promote flame holding conditions in which the combustion flame migrates toward the fuel being supplied by the fuel nozzles, possibly causing accelerated wear to the fuel nozzles in a relatively short amount of time. In addition, higher combustion gas temperatures generally increase the dissociation rate of diatomic nitrogen, increasing the production of nitrogen oxides ($NO_x$). Conversely, a lower combustion gas temperature associated with reduced fuel flow and/or part load operation (turndown) generally reduces the chemical reaction rates of the combustion gases, increasing the production of carbon monoxide and unburned hydrocarbons.

Although effective at enabling higher operating temperatures while protecting against flame holding and controlling undesirable emissions, at particular operating conditions, some combustors may produce combustion instabilities that result from an interaction or coupling of the combustion process or flame dynamics with one or more acoustic resonant frequencies of the combustor. For example, one mechanism of combustion instabilities may occur when the acoustic pressure pulsations cause a mass flow fluctuation at a fuel port which then results in a fuel-air ratio fluctuation in the flame. When the resulting fuel/air ratio fluctuation and the acoustic pressure pulsations have a certain phase behavior (e.g., in-phase or approximately in-phase), a self-excited feedback loop results. This mechanism, and the resulting magnitude of the combustion dynamics, depends on the delay time between the injection of the fuel and the time when it reaches the flame zone, known in the art as "convective time" (Tau). Generally, there is an inverse relationship between convective time and frequency: that is, as the convective time increases, the frequency of the combustion instabilities decreases; and when the convective time decreases, the frequency of the combustion instabilities increases.

It has been observed that, in some instances, combustion dynamics may reduce the useful life of one or more combustor and/or downstream components. For example, the combustion dynamics may produce pressure pulses inside the fuel nozzles and/or combustion chambers that may adversely affect the high cycle fatigue life of these components, the stability of the combustion flame, the design margins for flame holding, and/or undesirable emissions. Alternately, or in addition, combustion dynamics at specific frequencies and with sufficient amplitudes, that are in-phase and coherent, may produce undesirable sympathetic vibrations in the turbine and/or other downstream components.

By shifting the frequency of the combustion instability in one or more combustors away from the other combustors, the coherence of the combustion system as a whole will be reduced, and the combustor-to-combustor coupling will be diminished. This selective frequency shifting reduces the ability of the combustor system tone to cause a vibratory response in downstream components and also encourages destructive interference from combustor-to-combustor, reducing the amplitudes of combustion dynamics. Therefore, a system and method that selectively adjusts the phase and/or coherence of the combustion dynamics produced by at least some of the combustors in the combustor array would be useful to enhancing the thermodynamic efficiency of the combustion system, protecting against accelerated wear, promoting flame stability, and/or reducing undesirable emissions over a wide range of operating levels.

SUMMARY

Aspects and advantages of the invention are set forth below in the following description, or may be obvious from the description, or may be learned through practice of the invention.

One embodiment of the present invention is a system for reducing coherence and, therefore, modal coupling of combustion dynamics that includes first and second combustors arranged about an axis, where each combustor includes a fuel nozzle and a combustion chamber downstream from the fuel nozzle. Each fuel nozzle includes an axially extending center body, a shroud that circumferentially surrounds at least a portion of the axially extending center body, a plurality of vanes that extend radially between the center body and the shroud. The vanes define a first fuel port at a first axial distance from the combustion chamber and have a leading edge at a second axial distance from the combustion chamber. Differences in the first axial distance and/or the second axial distance in the first combustor and the second combustor produce a combustion instability frequency in the first combustor that is different from the combustion instability frequency in the second combustor.

In some aspects, the center body may define a fuel port located at a third axial distance from the combustion chamber.

In this and other aspects, a plurality of tube bundles may circumferentially surround each fuel nozzle, each tube bundle comprising a plurality of tubes and each tube comprising a fuel injectors extending through teach tube at a fourth axial distance from the combustor. In these and yet other aspects, the axial cap length of the first combustor may be different from the axial cap length of the second combustor. According to the teachings herein, one or more of the first axial distance, the second axial distance, the third axial distance, the fourth axial distance, and the axial cap length may be different in a first combustor as compared with a second combustor to produce different combustion instability frequencies between the two combustors.

The present invention may also include a method for reducing coherence and, therefore, modal coupling of combustion dynamics in a combustion system comprising a plurality of combustors. The method comprises providing a first combustor having a first liner defining a first combustion chamber, a first cap assembly, and at least one fuel nozzle housed within the first cap assembly and comprising an axially extending center body, a shroud circumferentially surrounding at least a portion of the axially extending center body and a plurality of vanes extending radially between the center body and the shroud, each vane defining at least a first fuel port located at a first axial distance from the first combustion chamber and further comprising a leading edge located at a second axial distance from the first combustion chamber; providing a second combustor having a second liner defining a second combustion chamber, a second cap assembly, and at least one fuel nozzle housed within the second cap assembly and comprising an axially extending center body, a shroud circumferentially surrounding at least a portion of the axially extending center body and a plurality of vanes extending radially between the center body and the shroud, each vane defining at least a first fuel port located at a first axial distance from the second combustion chamber and further comprising a leading edge located at a second axial distance from the second combustion chamber; wherein at least one of (i) the first axial distance in the first combustor is different from the first axial cap distance in the second combustor; and (ii) the second axial distance in the first combustor is different from the second axial distance in the second combustor.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
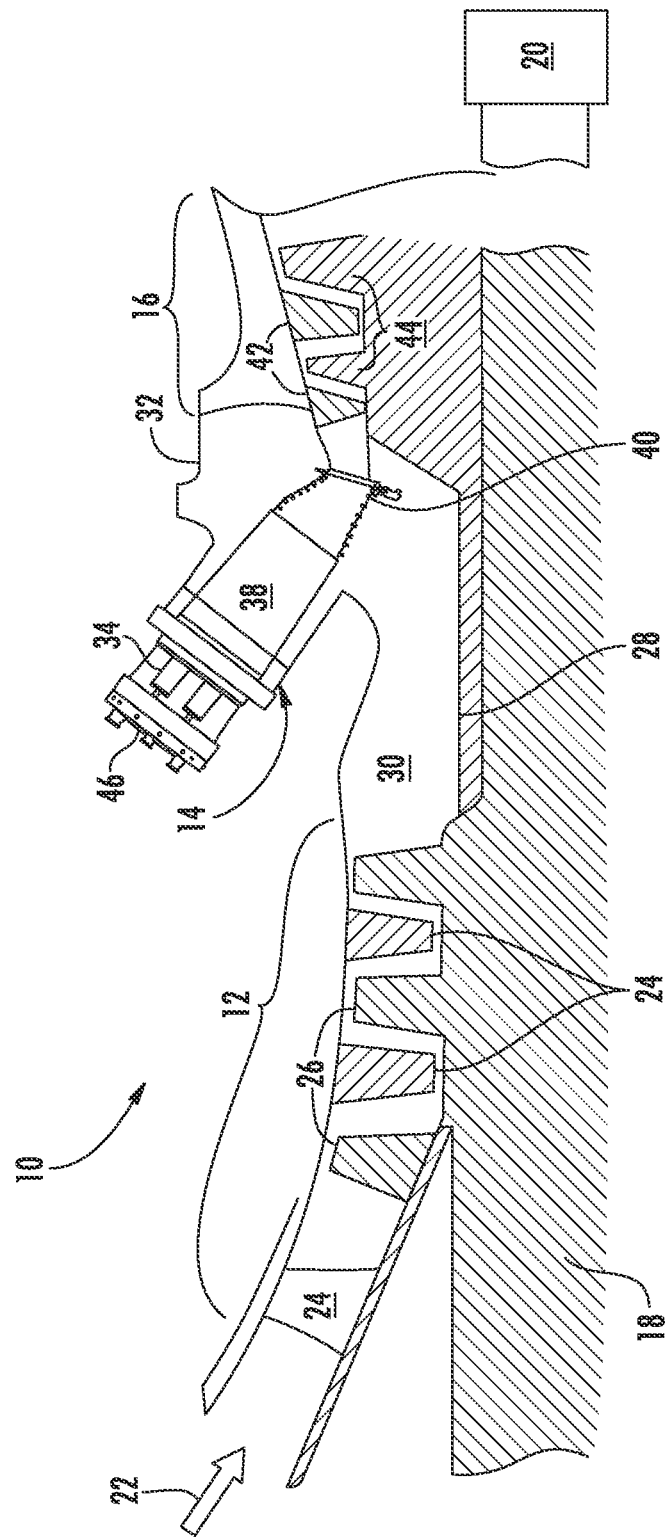
FIG. 1 is a simplified side cross-section view of an exemplary gas turbine, according to various embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present disclosure include a system and method for reducing coherence and, therefore, modal coupling of combustion dynamics to enhance thermodynamic efficiency, promote flame stability, and/or reduce undesirable emissions over a wide range of operating levels. The system and method generally include multiple combustors, and each combustor includes one or more fuel nozzles and/or tubes and a combustion chamber downstream from the fuel nozzle(s) and/or tubes. Each fuel nozzle includes one or more fuel ports and/or radially extending vanes, and each tube includes one or more fuel injectors. The fuel injectors may be fuel lances installed within the tubes or fuel injection holes integral with the tubes, the latter of which is illustrated in the Figures.

The system and method include various means for producing a combustion instability frequency in the first combustor that is different from the combustion instability frequency in the second combustor. As a result, various embodiments of the present invention may result in reduced combustion dynamics, extended operating conditions, extended life and/or maintenance intervals, improved design margins of flame holding, and/or reduced undesirable emissions. Although exemplary embodiments of the present invention will be described generally in the context of combustion dynamics in a gas turbine for purposes of illustration, one of ordinary skill in the art will readily appreciate that embodiments of the present invention may be applied to any combustion dynamics and are not limited to a gas turbine unless specifically recited in the claims.

FIG. 1 provides a simplified cross-section view of an exemplary gas turbine 10 that may incorporate various embodiments of the present invention. As shown, the gas turbine 10 may generally include a compressor section 12 at the front, multiple combustors 14 radially disposed in an array in a combustion section around the middle, and a turbine section 16 at the rear. The compressor section 12 and the turbine section 16 may share a common rotor 18, which is connected to a generator 20 to produce electricity. A working fluid 22, such as ambient air, may enter the compressor section 12 and pass through alternating stages of stationary vanes 24 and rotating blades 26. A compressor casing 28 contains the working fluid 22 as the stationary vanes 24 and rotating blades 26 accelerate and redirect the working fluid 22 to produce a continuous flow of compressed working fluid 22. The majority of the compressed working fluid 22 flows through a compressor discharge plenum 30 to the combustors 14.

FIG. 1 illustrates a single combustor 14 that may be part of a circumferential array of any number of combustors 14 arranged around a longitudinal axis of the gas turbine, which is generally coincident with the rotor 18. A combustor casing 32 may circumferentially surround some or all of each combustor 14 to contain the compressed working fluid 22 flowing from the compressor section 12. Fuel may be mixed with the compressed working fluid 22 in one or more fuel nozzles 34 and/or tubes 36. Possible fuels include, for example, one or more of blast furnace gas, coke oven gas, natural gas, vaporized liquefied natural gas (LNG), hydrogen, and propane. The mixture of fuel and compressed working fluid 22 may then flow into a combustion chamber 38 where it ignites to generate combustion gases having a high temperature and pressure. A transition duct 40 circumferentially surrounds at least a portion of the combustion chamber 38, and the combustion gases flow through the transition duct 40 to the turbine section 16.

The turbine section 16 may include alternating stages of stationary nozzles 42 and rotating buckets 44. The stationary nozzles 42 direct the combustion gases onto the next stage of rotating buckets 44, and the combustion gases expand as they pass over the rotating buckets 44, rotating the buckets 44 and rotor 18 to which the buckets 44 are attached. The combustion gases then flow to the next stage of stationary nozzles 42, which direct the combustion gases to the next stage of rotating buckets 44, and the process repeats for the following stages. Although two stages are shown in FIG. 1, the turbine section 16 is not limited to containing only two stages and may instead include other numbers of stages.

Figure 2:
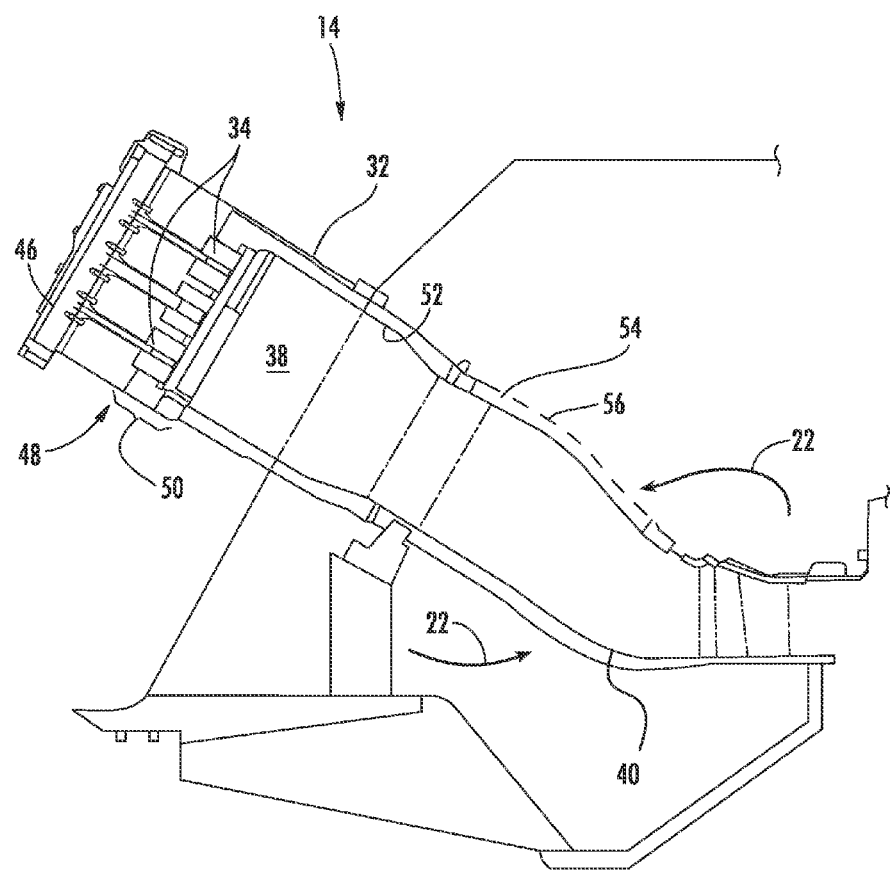
FIG. 2 is a simplified side cross-section view of an exemplary combustor, according to various embodiments of the present disclosure.

FIG. 2 provides a simplified side cross-section view of an exemplary combustor 14 according to various embodiments of the present invention. The combustor casing 32 circumferentially surrounds at least a portion of the combustor 14 to contain the compressed working fluid 22 flowing from the compressor 12. As shown in FIG. 2, the combustor casing 32 may be connected to or include an end cover 46 that extends radially across at least a portion of each combustor 14 to provide an interface for supplying fuel, diluent, and/or other additives to each combustor 14. In addition, the combustor casing 32 and end cover 46 may combine to at least partially define a head end 48 inside each combustor 14.

The fuel nozzles 34 and/or tubes 36 may be radially arranged in a cap assembly 50 relative to a longitudinal centerline axis of the combustor 14. The cap assembly 50 extends radially across at least a portion of each combustor 14 downstream from the head end 48. A liner 52 may be connected to the cap assembly 50 to at least partially define the combustion chamber 38 downstream from the cap assembly 50.

In operation, the working fluid 22 may flow, for example, through flow holes 54 in an impingement sleeve 56 and along the outside of the transition duct 40 and liner 52 to provide convective cooling to the transition duct 40 and liner 52. When the working fluid 22 reaches the head end 48, the working fluid 22 reverses direction, and the fuel nozzles 34 and/or tubes 36 provide fluid communication for the working fluid 22 to flow through the cap assembly 50 and into the combustion chamber 38. The above description is applied to combustors often described as "reverse flow" combustors, although the present invention is applicable to any type of combustor known in the art and is not limited to any particular combustor design, unless so recited in the claims.

While generally shown as circular, the cross-section of the fuel nozzles 34 and/or tubes 36 may be any geometric shape, and the present invention is not limited to any particular cross-sectional shape, unless specifically recited in the claims. In addition, various embodiments of the combustor 14 may include different numbers and arrangements of fuel nozzles 34 and/or tubes 36 in the cap assembly 50, and FIGS. 3-5 provide upstream plan views of exemplary arrangements of the fuel nozzles 34 and/or tubes 36 in the cap assembly 50 within the scope of the present invention.

Figure 3:
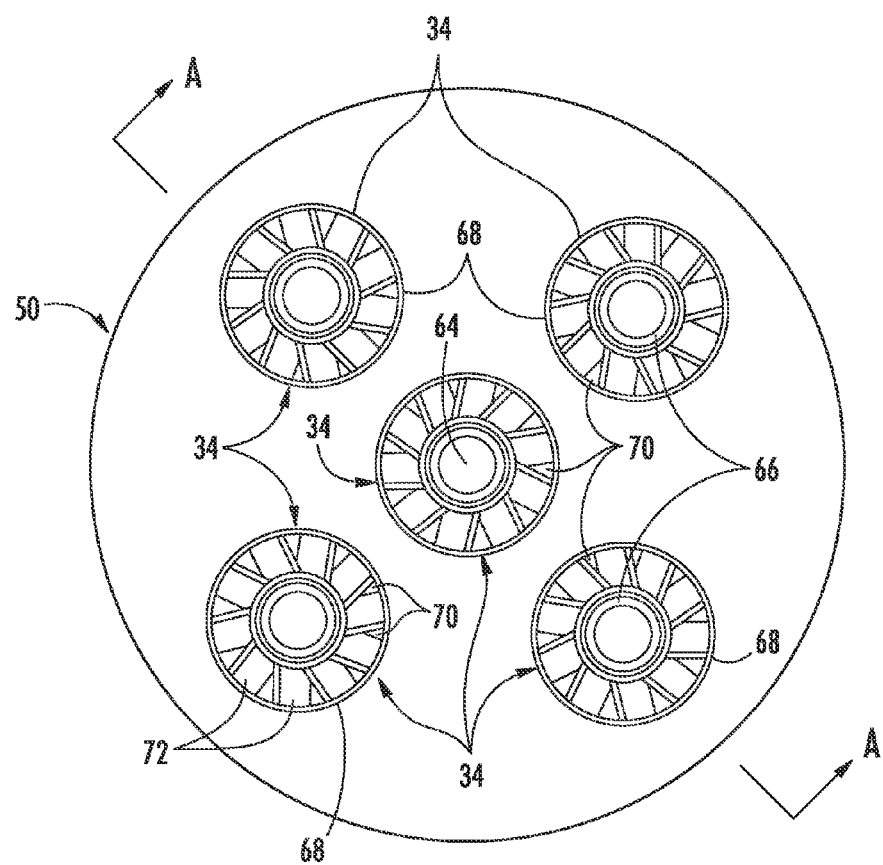
FIG. 3 is an upstream plan view of the cap assembly shown in FIG. 2, according to an embodiment of the present disclosure.

As shown in FIG. 3, for example, multiple fuel nozzles 34 may be radially arranged around a single fuel nozzle 34. Alternately, as shown in FIG. 4, the tubes 36 may be radially arranged across the entire cap assembly 50, and the tubes 36 may be divided into various groups to facilitate multiple fueling regimes over the range of operations of the combustor 14. For example, the tubes 36 may be grouped in a plurality of circular tube bundles 58 that circumferentially surround a center tube bundle 60, as shown in FIG. 4. Alternately, as shown in FIG. 5, a single fuel nozzle 34 may be circumferentially surrounded by a plurality of tube bundles 62 having a truncated pie-shape.

Figure 4:
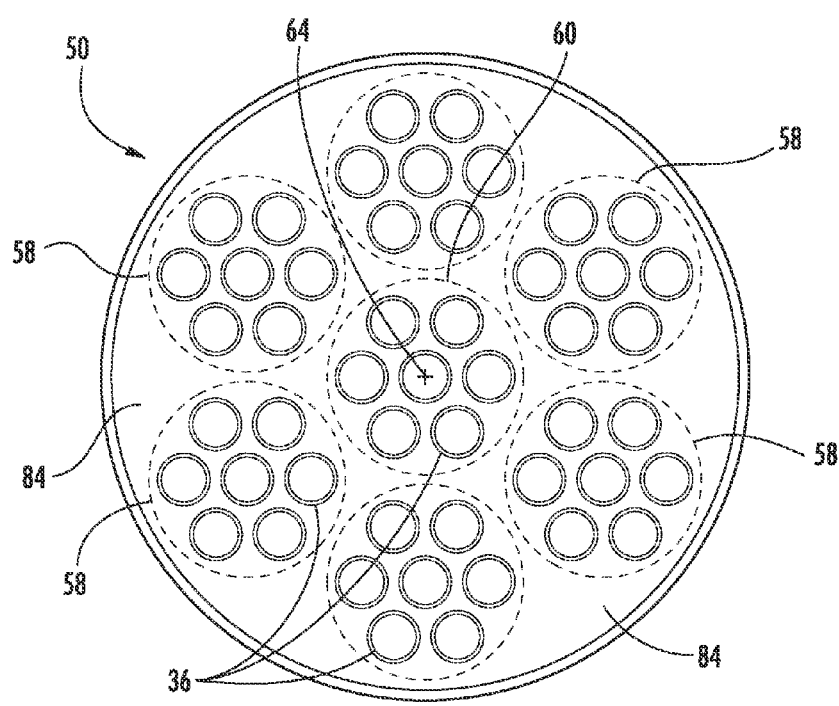
FIG. 4 is an upstream plan view of the cap assembly shown in FIG. 2, according to an alternate embodiment of the present disclosure.
Figure 5:
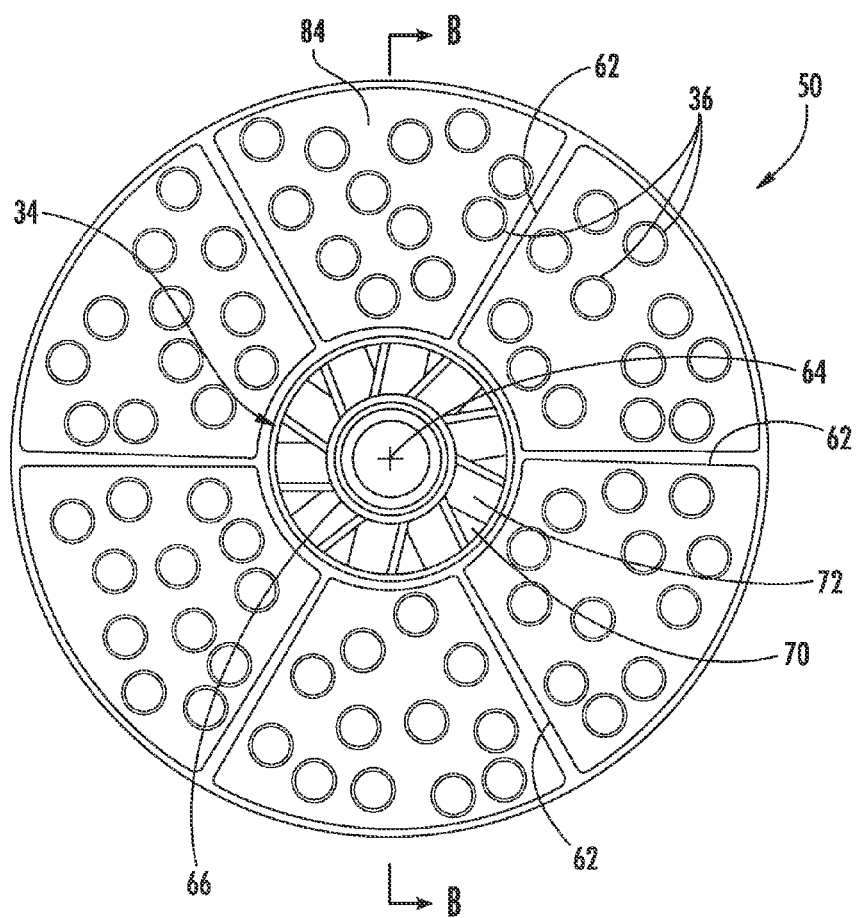
FIG. 5 is an upstream plan view of the cap assembly shown in FIG. 2, according to an alternate embodiment of the present disclosure.

During base load operations, fuel may be supplied to each fuel nozzle 34 and tube bundle 58, 60, 62 shown in FIGS. 3-5. During reduced or turndown operations, fuel flow may be reduced or completely eliminated from the center fuel nozzle 34 or center tube bundle 60 and/or one or more circumferentially arranged fuel nozzles 34 or circular or pie-shaped tube bundles 58, 62. One of ordinary skill in the art will readily appreciate multiple other shapes and arrangements for the fuel nozzles 34, tubes 36, and tube bundles 58, 60, 62 from the teachings herein, and the particular shape and arrangement of the fuel nozzles 34, tubes 36, and tube bundles 58, 60, 62 are not limitations of the present invention unless specifically recited in the claims.

Figure 6:
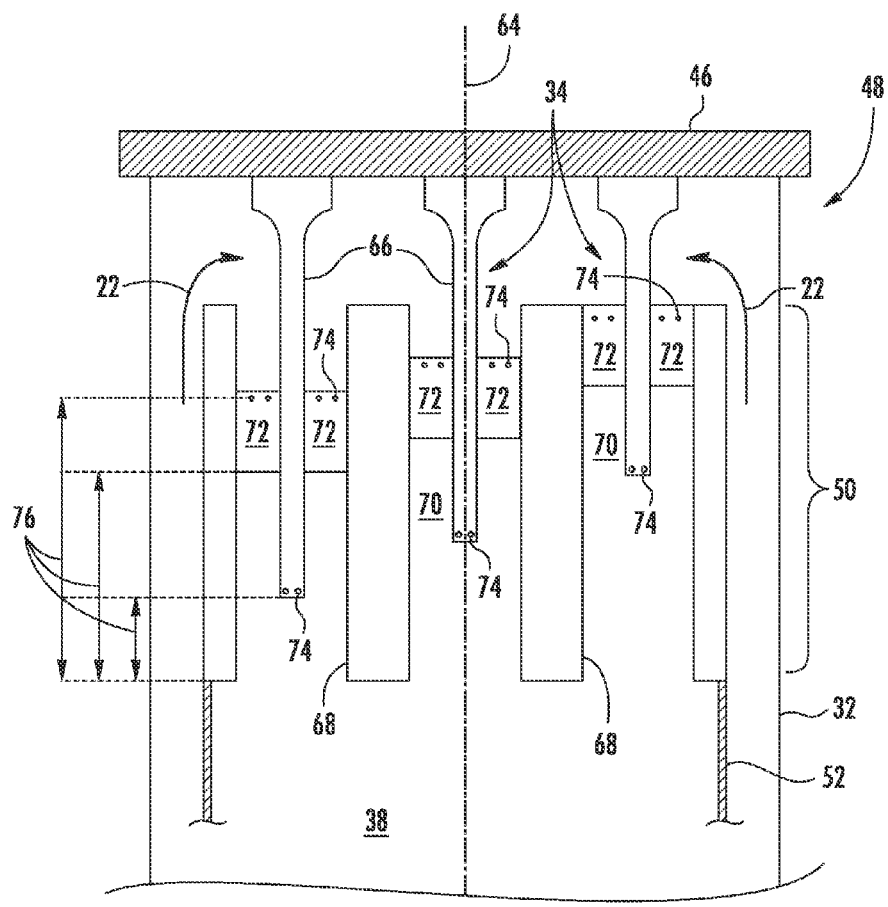
FIG. 6 is a side cross-section view of the head end of the combustor shown in FIG. 3 taken along line A-A, according to an embodiment of the present disclosure.

FIG. 6 provides a side cross-section view of the head end 48 of the combustor 14 shown in FIG. 3 taken along line A-A, according to an embodiment of the present disclosure. As shown in FIGS. 3 and 6, the combustor 14 may include a plurality of fuel nozzles 34 radially arranged around a center fuel nozzle 34 that is substantially aligned with an axial centerline 64 of the combustor 14.

Each fuel nozzle 34 may include a center body 66 that extends axially downstream from the end cover 46 and a shroud 68 that circumferentially surrounds at least a portion of the center body 66 to define an annular passage 70 between the center body 66 and the shroud 68. One or more vanes 72 may extend radially between the center body 66 and the shroud 68, and the vanes 72 may be angled or curved to impart swirl to the working fluid 22 flowing through the annular passage 70 between the center body 66 and the shroud 68. The vanes 72 and/or the center body 66 may include one or more fuel ports 74. In this manner, fuel may be supplied through the center body 66 and/or vanes 72, and the fuel ports 74 provide fluid communication for the fuel to flow into the annular passage 70 and mix with the working fluid 22 before the mixture reaches the combustion chamber 38.

When the fuel nozzles 34 are incorporated into the combustor 14, such as the exemplary combustor 14 shown in FIG. 2, the resulting combustion process in the combustion chamber 38 may produce heat release fluctuations that may couple with one or more acoustic modes of the combustor 14, generating combustion instabilities. One specific mechanism that may produce combustion instabilities occurs when the acoustic pulsations driven by the heat release fluctuations cause mass flow fluctuations through the fuel ports 74.

For example, the pressure pulses associated with the combustion flames may propagate upstream from the combustion chamber 38 into each annular passage 70. When the pressure pulses reach the fuel ports 74 and/or vanes 72, the pressure pulses may interfere with the fuel flow through the fuel ports 74 and/or over the vanes 72, creating fluctuations in the fuel-air mixture concentration flowing downstream toward the combustion flame. This fuel/air ratio fluctuation then travels downstream to the flame region where it causes a heat release fluctuation. Provided the resulting heat release fluctuation is approximately in-phase with the pressure fluctuations, it will further encourage heat release fluctuations, creating a continuous feedback loop. Conversely, if the resulting heat release fluctuation and the pressure fluctuations are out-of-phase, destructive interfere will decrease the magnitude of the combustion instability frequency associated with the particular fuel nozzle 34.

The resulting combustion instability frequencies will be a function of the time it takes for the acoustic pressure pulse to reach the fuel port and the resulting fuel/air ratio disturbance to reach the flame zone. This time is known in the art as "convective time," or Tau. The combustion instability frequencies generated by the interaction of the fuel/air ratio fluctuations and the acoustic pressure fluctuation are therefore inversely proportional to the axial distance between the fuel ports 74 and/or the vanes 72 and the combustion chamber 38 (i.e., the end of the fuel nozzles 34 or the end of the shrouds 68). In particular embodiments, these combustion instability frequencies may be adjusted and/or tuned in one or more fuel nozzles 34 to affect the combustion dynamics associated with the individual combustor 14.

In the particular embodiment shown in FIGS. 3 and 6, for example, the combustor 14 may include multiple fuel nozzles 34, with a different axial distance 76 between the fuel ports 74 and/or the vanes 72 and the combustion chamber 38 for at least two of the fuel nozzles 34. A first axial distance 76a is defined between the fuel ports 74 in the vane 72 and the combustion chamber 38. A second axial distance 76b is defined between the leading edge of the vane 72 and the combustion chamber 38. A third axial distance 76c is defined between the fuel ports 74 on the center body 66 and the combustion chamber 38. As a result of having different axial distances of at least one of the axial distances 76a-76c, the combustion instability frequency generated for the fuel nozzles 34 will be different, reducing the likelihood that the constructive interference between the fuel nozzles 34 will lead to an increase in the amplitude of the combustion dynamics associated with the particular combustor 14.

One of ordinary skill in the art will readily appreciate from the teachings herein that multiple combinations of variations in the axial distances 76 between the fuel ports 74 and/or the vanes 72 and the combustion chamber 38 are possible to achieve a desired combustion instability frequency for the fuel nozzles 34 and/or desired combustion dynamics for the particular combustor 14. It is not necessary that each of the fuel nozzles 34 within the particular combustor 14 be different from all of the other fuel nozzles 34 within the combustor 14. For example, in particular embodiments, the axial distances 76 between the fuel ports 74 and/or the vanes 72 and the combustion chamber 38 may be the same or different for some or all of the fuel nozzles 34 in a particular combustor 14, and the present invention is not limited to any particular combination of axial distances 76 except to the extent recited in the claims.

The combustion dynamics associated with multiple combustors 14 incorporated into the gas turbine 10 may either constructively or destructively interfere with one another to increase or decrease, respectively, the amplitude and/or coherence of the combustion dynamics associated with the gas turbine 10. In particular embodiments, the combustion dynamics associated with one or more combustors 14 may be adjusted and/or tuned to affect the interaction with the combustion dynamics of another combustor 14 and, thus, the combustion dynamics associated with the gas turbine 10. For example, FIG. 7 illustrates a system for reducing coherence and, therefore, modal coupling of combustion dynamics according to a first embodiment of the present invention.

Figure 7:
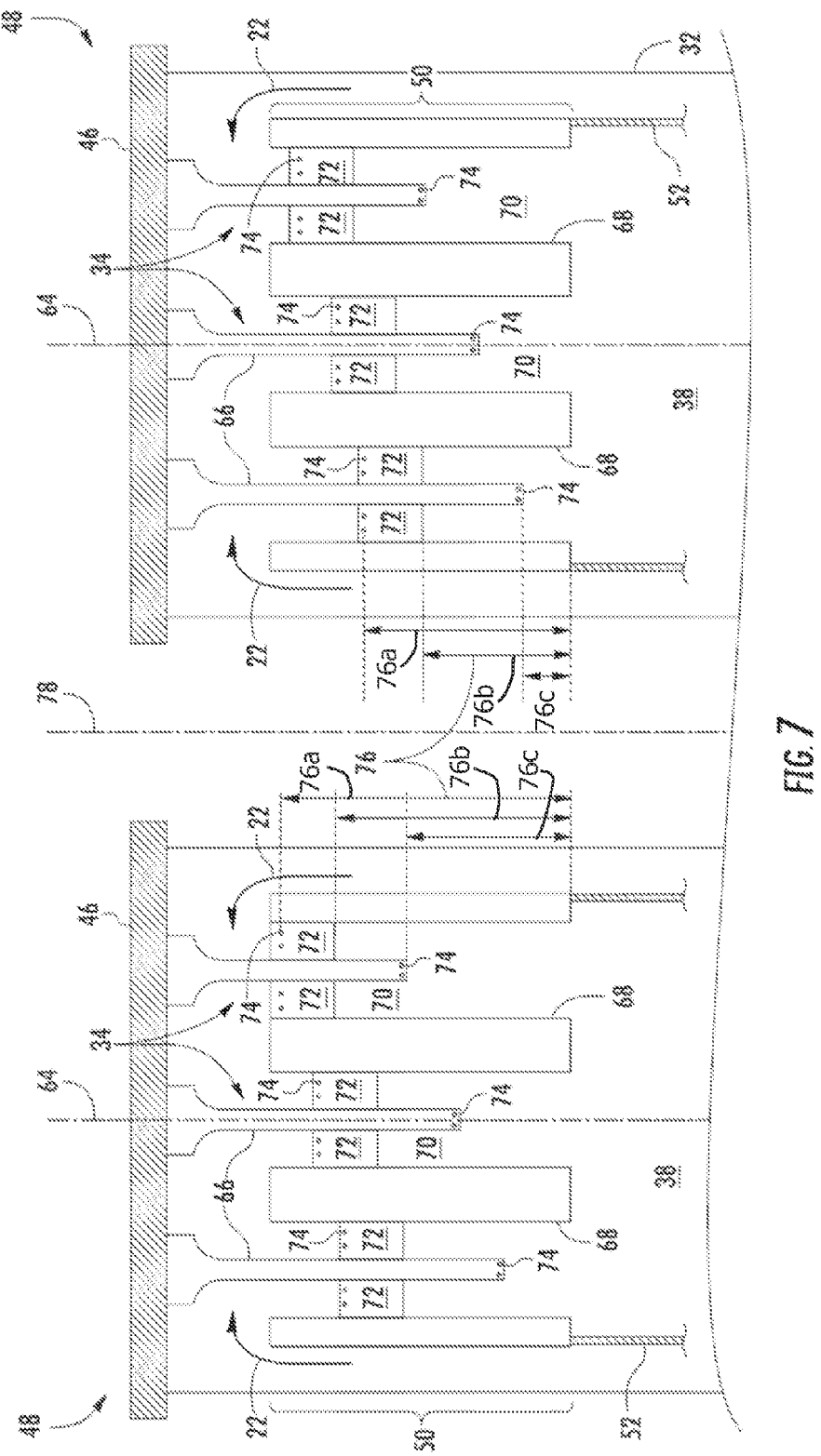
FIG. 7 is a side cross-section view of a system for reducing coherence and modal coupling of combustion dynamics, according to a first embodiment of the present disclosure.

In the particular embodiment shown in FIG. 7, multiple combustors 14 (having fuel nozzles 34, as shown in FIGS. 3 and 6) have been arranged about an axis 78. The axis 78 may coincide, for example, with the rotor 18 in the gas turbine 10 that connects the compressor section 12 to the turbine section 16, although the present invention is not limited to the particular orientation of the axis 78 or the particular arrangement of the combustors 14 about the axis 78.

As shown in FIG. 7, each combustor 14 includes multiple fuel nozzles 34 with the combustion chamber 38 downstream from the fuel nozzles 34 as previously described with respect to FIGS. 2, 3, and 6. In addition, the system further includes means for producing a combustion instability frequency in one combustor 14 that is different from the combustion instability frequency in at least one other combustor 14. The means for producing a combustion instability frequency in one combustor 14 that is different from the combustion instability frequency in the other combustor 14 is to reduce or prevent coherent or constructive interference between the combustion dynamics of the combustors, which may increase the amplitude of the combustion dynamics or increase the coherence of the combustion dynamics of two or more combustors 14.

The structure for the means may include a difference in one or more of the axial distances 76a, 76c between the fuel ports 74 and the combustion chamber 38 and/or the axial distance 76b between the vanes 72 and the combustion chamber 38 between the two combustors 14. In the particular embodiment shown in FIG. 7, for example, each axial distance 76a, 76c between the fuel ports 74 and the combustion chamber 38 and the axial distance 76b between the vanes 72 and the combustion chamber 38 is different between the two combustors 14. As a result, the means produces different combustion instability frequencies in the two combustors 14.

FIG. 7 illustrates a pair of combustors 14 in which each axial distance 76a, 76b, 76c is varied both for each of the fuel nozzles 34 within a combustor 14 and from a first combustor 14 to a second combustor 14. However, one of ordinary skill in the art will readily appreciate from the teachings herein that multiple combinations of variations in the axial distances 76a, 76c between the fuel ports 74 and the combustion chamber 38 and/or the axial distances 76b between the vanes 72 and the combustion chamber 38 are possible to produce a combustion instability frequency in one combustor 14 that is different from the combustion instability frequency in the other combustor 14.

For example, in particular embodiments, one or more axial distances 76a, 76c between the fuel ports 74 and the combustion chamber 38 and/or the axial distances 76b between the vanes 72 and the combustion chamber 38 may be the same or different for one or more of the fuel nozzles 34 in a particular combustor 14 (or group of combustors) compared to the other combustor 14 (or another group of combustors), as long as the axial distances 76a, 76b, 76c are not all the same among all of the combustors 14. Thus, the present invention is not limited to any particular combination of axial distances 76 (that is, 76a, 76b, 76c), unless specifically recited in the claims.

Figure 8:
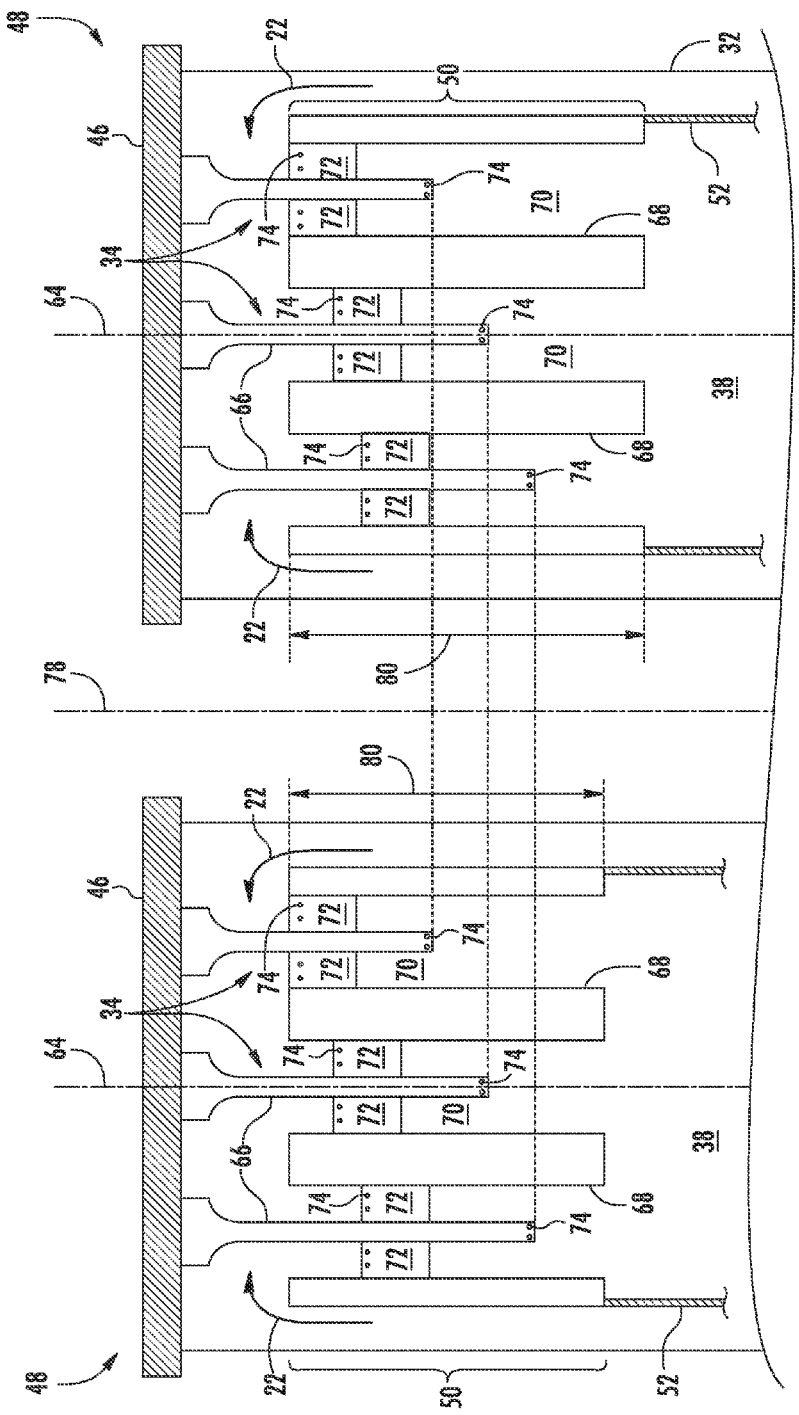
FIG. 8 is a side cross-section view of a system for reducing coherence and modal coupling of combustion dynamics, according to a second embodiment of the present disclosure.

FIG. 8 provides a system for reducing combustion dynamics according to a second embodiment of the present invention. As shown in FIG. 8, each combustor 14 again includes multiple fuel nozzles 34 with the combustion chamber 38 downstream from the fuel nozzles 34 as previously described. In addition, the axial positions of the fuel ports 74 and/or the vanes 72 may be the same or different in each combustor 14.

In the specific embodiment shown in FIG. 8, for example, the axial distances 76a, 76c between the fuel ports 74 and the combustion chamber 38 and the axial distances 76b between the vanes 72 and the combustion chamber 38 are different within the same combustor 14, but the axial positions of the fuel ports 74 and the vanes 72 relative to the end cover 46 are repeated in both of the combustors 14. It is contemplated that such a configuration may be applied to all of the combustors 14 in an array of combustors of the gas turbine, or may be applied to some sub-set of "n" combustors 14 in the array.

The embodiment shown in FIG. 8 also produces a combustion instability frequency in one combustor 14 that is different from the combustion instability frequency in the other combustor 14. In this particular embodiment, the structure for the means may include a difference in an axial length 80 of the cap assembly 50 in one combustor 14 compared to the axial length 80 of the cap assembly in the other combustor 14. With the axial positions of the fuel ports 74 and the vanes 72 (relative to the end cover 46) repeated in both of the combustors 14, the difference in the axial lengths 80 between the two combustors 14 produces a corresponding difference in the axial distances 76a, 76c between the fuel ports 74 and the combustion chamber 38 and in the axial distances 76b between the vanes 72 and the combustion chamber 38 from combustor to combustor. The difference in axial distances 76a, 76b, and/or 76c between the two combustors 14, which in this example results from the different cap assembly lengths, produces a corresponding difference in the combustion instability frequencies between the two combustors 14.

One of ordinary skill in the art will readily appreciate from the teachings herein that multiple combinations of variations in the axial distances 76a, 76c between the fuel ports 74 and the combustion chamber 38 and/or the axial distances 76b between the vanes 72 and the combustion chamber 38 are possible to produce a combustion instability frequency in one combustor 14 that is different from the combustion instability frequency in the other combustor 14. For example, in particular embodiments, one or more axial distances 76a, 76c between the fuel ports 74 and the combustion chamber 38 and/or one or more axial distances 76b between the vanes 72 and the combustion chamber 38 may be the same or different for one or more of the fuel nozzles 34 in a particular combustor 14 compared to the other combustor 14. Thus, the present invention is not limited to any particular combination of axial distances 76 unless specifically recited in the claims.

Figure 9:
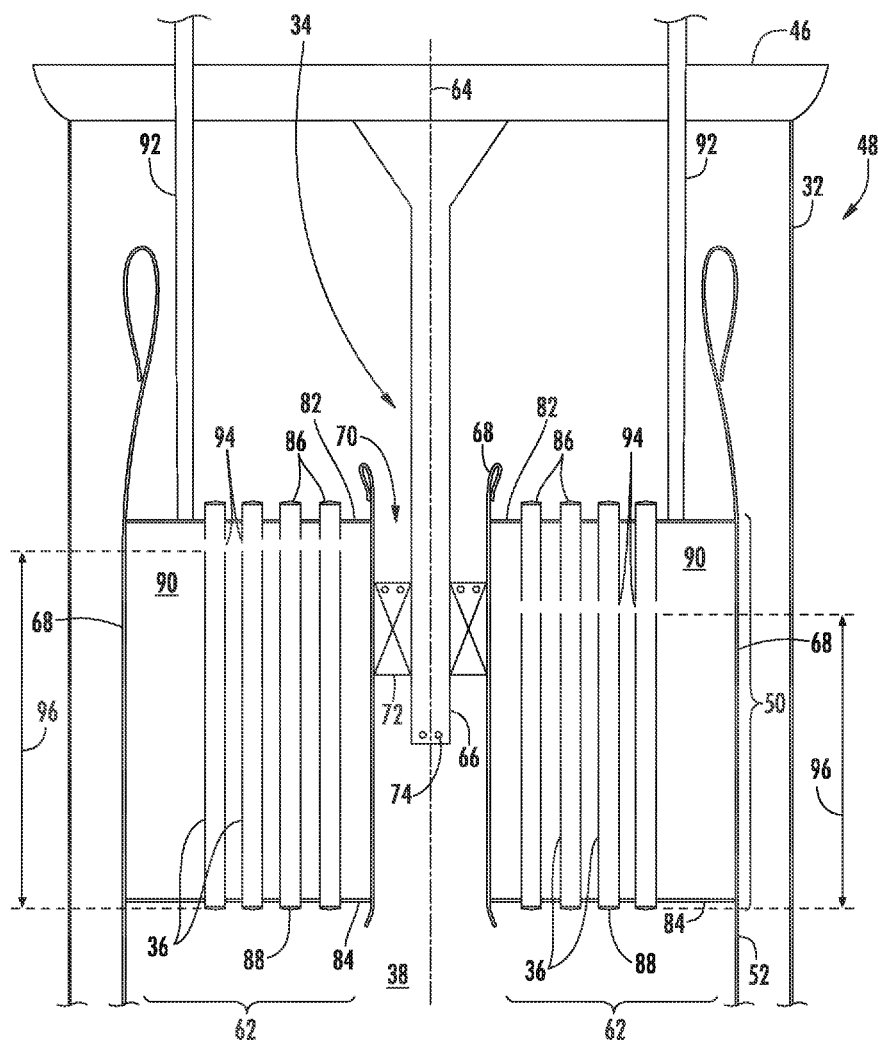
FIG. 9 is a side cross-section view of the head end of the combustor shown in FIG. 5 taken along line B-B, according to an embodiment of the present disclosure.

FIG. 9 provides a side cross-section view of the head end 48 of the combustor 14 shown in FIG. 5 taken along line B-B according to an embodiment of the present invention. As shown, the cap assembly 50 extends radially across at least a portion of the combustor 14 and includes an upstream surface 82 axially separated from a downstream surface 84. The upstream and downstream surfaces 82, 84 may be generally flat or straight and oriented perpendicular to the general flow of the working fluid 22 through the cap assembly 50. In the particular embodiment shown in FIG. 9, the fuel nozzle 34 is again substantially aligned with the axial centerline 64 of the cap assembly 50 and extends through the cap assembly 50 to provide fluid communication through the cap assembly 50 to the combustion chamber 38. The fuel nozzle 34 may include any suitable structure known to one of ordinary skill in the art for mixing fuel with the working fluid 22 prior to entry into the combustion chamber 38, and the present invention is not limited to any particular structure or design unless specifically recited in the claims. For example, as shown in FIG. 9, the fuel nozzle 34 may include the center body 66, shroud 68, annular passage 70, vanes 72, and fuel ports 74 as previously described with respect to the embodiment shown in FIG. 6.

The tubes 36 may be arranged in bundles to produce round nozzles (as shown in FIG. 4) or nozzles 62 having a truncated pie-shape (as shown in FIG. 9). As shown in FIGS. 5 and 9, the tubes 36 may be arranged in bundles 62 that are circumferentially disposed around the fuel nozzle 34. The tube bundles 62 may extend from the upstream surface 82 to, or through, the downstream surface 84 of the cap assembly 50. Each tube 36 generally includes an inlet 86 proximate to the upstream surface 82 and an outlet 88 proximate to the downstream surface 84 to provide fluid communication through the cap assembly 50 and into the combustion chamber 38 downstream from the tubes 36.

As shown in FIG. 9, the upstream and downstream surfaces 82, 84 may at least partially define a fuel plenum 90 inside the cap assembly 50. A fuel conduit 92 may extend from the casing 32 and/or the end cover 46 through the upstream surface 82 to provide fluid communication for fuel to flow into the fuel plenum 90. One or more of the tubes 36 may include a fuel injector 94 (for example, a fuel injection hole) that extends through the tubes 36 to provide fluid communication from the fuel plenum 90 into the tubes 36. The fuel injectors 94 may be angled radially, axially, and/or azimuthally to project and/or impart swirl to the fuel flowing through the fuel injectors 94 and into the tubes 36. The working fluid 22 may thus flow into the tube inlets 86, while fuel from the fuel conduit 92 may flow around the tubes 36 in the fuel plenum 90 and into the tubes 36 to mix with the working fluid 22. As the fuel flows around the tubes 36, the fuel provides convective cooling to the tubes 36. The fuel-working fluid mixture may then flow through the tubes 36 and be discharged from the outlets 88 into the combustion chamber 38.

As previously described with respect to the embodiment shown in FIG. 6, when the tubes 36 are incorporated into the combustor 14, such as the exemplary combustor 14 shown in FIG. 2, the resulting combustion process in the combustion chamber 38 may produce heat release fluctuations that may couple with one or more acoustic modes of the combustor 14, generating combustion instabilities. One specific mechanism by which combustion instabilities may be produced occurs when the acoustic pulsations driven by the heat release fluctuations travel upstream to the fuel injectors 94 where they may interfere with the fuel flow through the fuel injectors 94 and create fluctuations in the fuel-air mixture concentration flowing downstream toward the combustion flame. This fuel/air ratio fluctuation then travels downstream to the flame region where it can cause a heat release fluctuation.

Provided the resulting heat release fluctuation is approximately in-phase with the pressure fluctuations, it will further encourage heat release fluctuations, completing a continuous feedback loop. Conversely, if the resulting heat release fluctuation and the pressure fluctuations are out-of-phase, destructive interfere will decrease the magnitude of the combustion instability frequency associated with the tubes 36, tube bundles 62, and/or cap assembly 50. The combustion instability frequencies associated with the tubes 36 and/or tube bundles 62 may either constructively or destructively interfere with one another to increase or decrease, respectively, the amplitude of the combustion dynamics associated with the particular combustor 14.

The combustion instability frequencies generated by the interaction of the fuel/air ratio fluctuations and the acoustic pressure fluctuation are inversely proportional to the axial distance between the fuel injectors 94 and the combustion chamber 38 (i.e., the tube outlets 88). In particular embodiments, these combustion instability frequencies may be adjusted and/or tuned in one or more tubes 36 and/or tube bundles 62 to affect the combustion dynamics associated with the individual combustor 14.

In the particular embodiment shown in FIGS. 5 and 9, for example, the tubes 36 may have a different axial distance 96 between the fuel injectors 94 and the combustion chamber 38 for each tube bundle 62. As a result, the combustion instability frequency for each tube 62 will be different, reducing the likelihood that the constructive interference between the tube bundles 62 will lead to an increase in the amplitude of the combustion dynamics associated with the particular combustor 14

One of ordinary skill in the art will readily appreciate from the teachings herein that multiple combinations of variations in the axial distances 96 between the fuel injectors 94 and the combustion chamber 38 are possible to achieve a desired combustion instability frequency for each tube 36 and/or tube bundle 62 and/or desired combustion dynamics for the particular combustor 14. For example, in particular embodiments, the axial distances 96 between the fuel injectors 94 and the combustion chamber 38 may be the same or different for some or all of the tubes 36 and/or tube bundles 62 in a particular combustor 14, and the present invention is not limited to any particular combination of axial distances 96 unless specifically recited in the claims.

Figure 10:
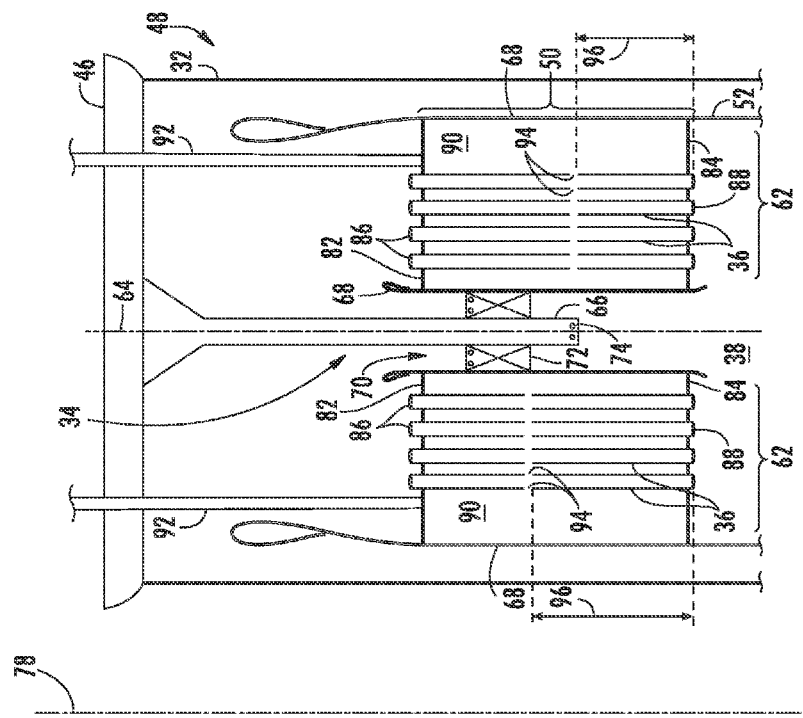
FIG. 10 is a side cross-section view of a system for reducing coherence and modal coupling of combustion dynamics, according to a third embodiment of the present disclosure.
Figure 10:
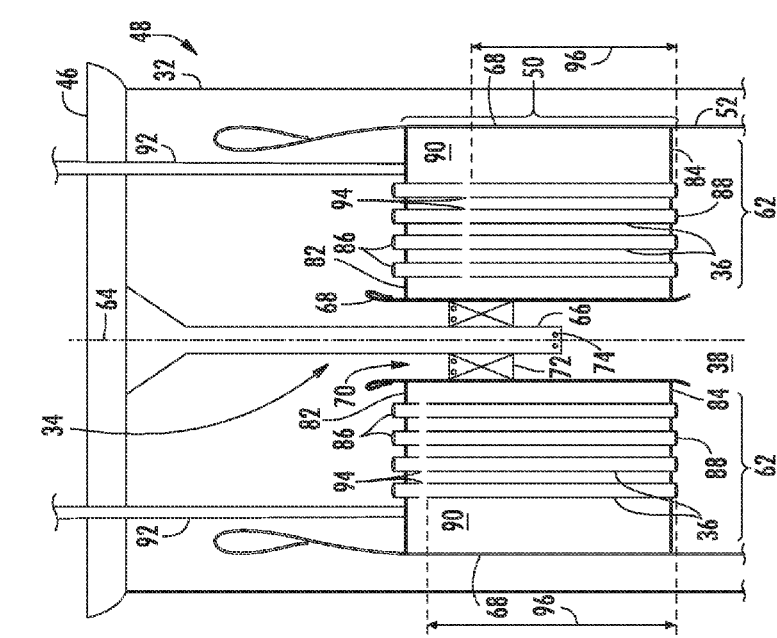

The combustion dynamics associated with multiple combustors 14 incorporated into the gas turbine 10 may either constructively or destructively interfere with one another to increase or decrease, respectively, the amplitude, coherence, and/or modal coupling of the combustion dynamics associated with the gas turbine 10. For example, FIG. 10 provides a system for reducing modal coupling of the combustion dynamics according to a third embodiment of the present invention. In the particular embodiment shown in FIG. 10, multiple combustors 14 (as shown in FIGS. 5 and 9) have been arranged about an axis 100. The axis 100 may coincide, for example, with the rotor 18 in the gas turbine 10 that connects the compressor section 12 to the turbine section 16, although the present invention is not limited to the particular orientation of the axis 100 or the particular arrangement of the combustors 14 about the axis 100.

As shown in FIG. 10, each combustor 14 includes multiple tubes 36 arranged in pie-shaped tube bundles 62 that circumferentially surround the fuel nozzle 34, and the combustion chamber 38 is downstream from the tubes 36, tube bundles 62, and fuel nozzle 34 as previously described. In addition, the system further includes a means for producing a combustion instability frequency in one combustor 14 that is different from the combustion instability frequency in the other combustor 14. The structure for the means may include a difference in one or more of the axial distances 96 between the fuel injectors 94 and the combustion chamber 38 between the two combustors 14. In the particular embodiment shown in FIG. 10, for example, the axial distance 96 between the fuel injectors 94 and the combustion chamber 38 for each tube bundle 62 is different between the two combustors 14. As a result, the structure produces different combustion instability frequencies in the two combustors 14.

One of ordinary skill in the art will readily appreciate from the teachings herein that multiple combinations of variations in the axial distances 96 between the fuel injectors 94 and the combustion chamber 38 are possible to produce a combustion instability frequency in one combustor 14 that is different from the combustion instability frequency in the other combustor 14. For example, in particular embodiments, one or more axial distances 96 between the fuel injectors 94 and the combustion chamber 38 may be the same or different for one or more of the tubes 36 and/or tube bundles 62 in a particular combustor 14 compared to the other combustor 14, as long as the axial distances 96 are not all the same between all combustors 14. It should also be appreciated that the distances between the fuel injectors 94 and the combustion chamber 38 may be uniform or equal for all of the tube bundles 62 in a particular combustor and may be of one or more different distances (not equal to the distance in the first combustor) in the tube bundles 62 of the second combustor 14. Any configurations that produce different convective times between at least some of the tube bundles in at least some of the combustors may be employed to achieve the desired coherence disruption. Thus, the present invention is not limited to any particular combination of axial distances 96 unless specifically recited in the claims.

Figure 11:
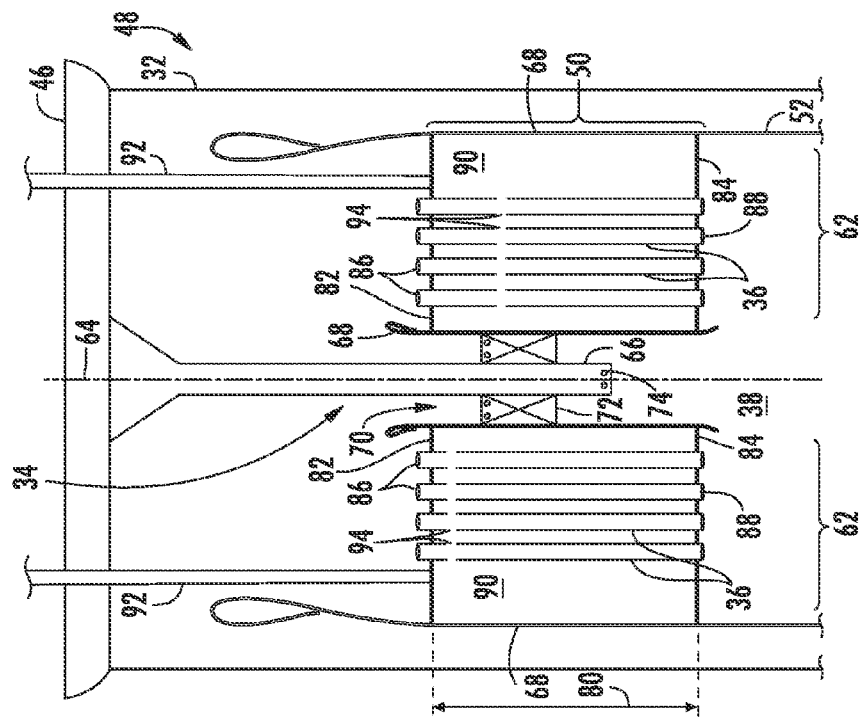
FIG. 11 is a side cross-section view of a system for reducing coherence and modal coupling of combustion dynamics, according to a fourth embodiment of the present disclosure.
Figure 11:
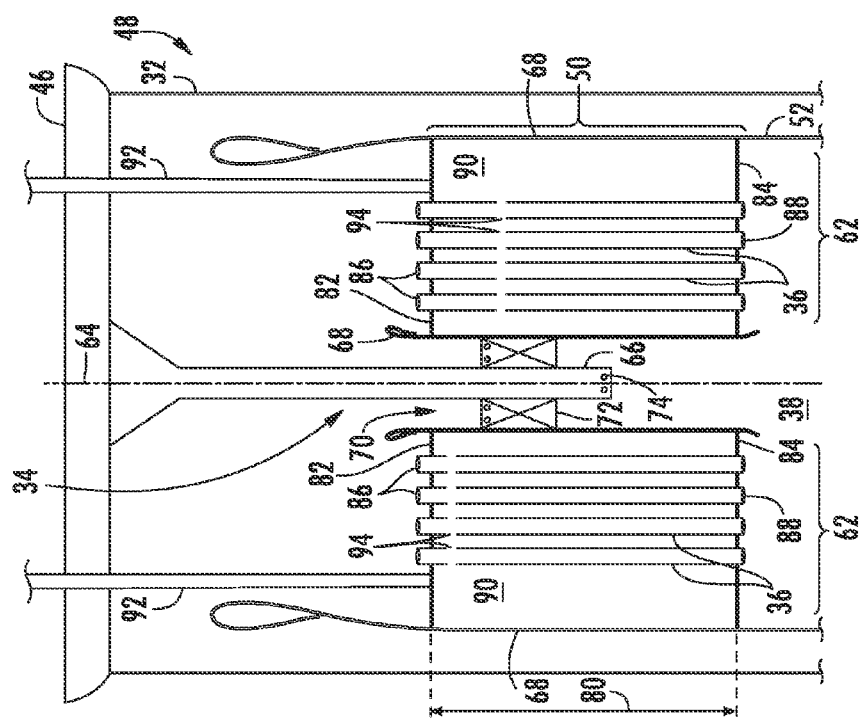

FIG. 11 provides a system for reducing combustion dynamics, according to a fourth embodiment of the present invention. As shown in FIG. 11, each combustor 14 includes multiple tubes 36 arranged in pie-shaped tube bundles 62 that circumferentially surround the fuel nozzle 34. The combustion chamber 38 is downstream from the tubes 36, tube bundles 62, and fuel nozzle 34 as previously described. In addition, the axial positions of the fuel injectors 94 (relative to the end cover 46) may be the same or different in each combustor 14. In the specific embodiment shown in FIG. 11, for example, the axial positions of the fuel injectors 94 (relative to the end cover 46) are different for each tube bundle 62 within the same combustor 14.

The embodiment shown in FIG. 11 includes yet another means for producing a combustion instability frequency in one combustor 14 that is different from the combustion instability frequency in the other combustor 14. As with the previous embodiment described and illustrated in FIG. 8, the structure for the means may include a difference in the axial length 80 of the cap assembly 50 in one combustor 14 compared to the axial length 80 of the cap assembly in the other combustor 14. In this exemplary embodiment, the axial positions of the fuel injectors 94 with respect to the end cover 46 are the same in the two combustors 14. However, because the axial length 80 of the cap assembly 50 in one combustor 14 (i.e., the combustor on the left side of FIG. 11) is different from the axial length 80 of the cap assembly 50 in the other combustor 14 (i.e., the combustor on the right side), the tube bundles 92 in the combustor 14 on the left side include longer tubes. The longer tubes result in a different convective time for the fuel/air mixture in the left combustor, as compared with the convective times for the fuel/air mixture in the right combustor, despite the same axial distances between the fuel injectors 94 and the end covers 46. Thus, the difference in axial distances 96 between the two combustors 14 produces a corresponding difference in the combustion instability or resonant frequencies between the two combustors 14.

Regarding the tube bundles 62 illustrated in FIGS. 9-11, it has been described above that the fuel injectors 94 are in fluid communication with a fuel plenum 90 that surrounds at least a portion of the tubes 36. The fuel plenum 90 may or may not extend the full distance between the upstream surface 82 and the downstream surface 84; that is, an intermediate plate (not shown) may be positioned between the upstream surface 82 and the downstream surface 84 to define a smaller fuel plenum 90. It should be understood that, even when the fuel plenum 90 occupies only some portion of the volume between the upstream surface 82 and the downstream surface 84, the fuel plenum 90 is located for fluid communication with the fuel injectors 94. Specifically, the fuel plenum 90 is positioned according to the axial positioning of the fuel injectors 94, which may vary within a combustor 14 or from one combustor 14 to another.

One of ordinary skill in the art will readily appreciate from the teachings herein that multiple combinations of variations in the axial distances 96 between the fuel injectors 94 and the combustion chamber 38 are possible to produce a combustion instability frequency in one combustor 14 that is different from the combustion instability frequency in the other combustor 14. For example, in particular embodiments, one or more axial distances 96 between the fuel injectors 94 and the combustion chamber 38 may be the same or different for one or more of the tubes 36 and/or tube bundles 62 in a particular combustor 14 compared to the other combustor 14. Thus, as before, the present invention is not limited to any particular combination of axial distances 96 unless specifically recited in the claims.

Figure 12:
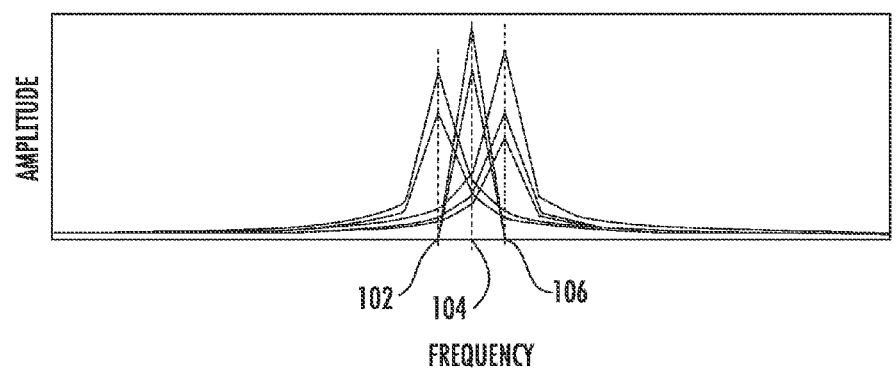
FIG. 12 is an exemplary graph of combustor dynamics, according to various embodiments of the present disclosure.

FIG. 12 provides an exemplary graph of combustor dynamics according to various embodiments of the present invention. The horizontal axis represents a range of combustion instability frequencies, and the vertical axis represents a range of amplitudes. The system depicted in FIG. 12 may include three or more combustors 14 incorporated into the gas turbine 10 or other turbo-machine. Using the means for producing a combustion instability frequency in one combustor 14 that is different from the combustion instability frequency in the other combustor 14, each combustor 14 may be adjusted or tuned to achieve a desired combustion instability frequency or combustion dynamics.

As shown in FIG. 12, for example, a first group of the combustors 14 may be adjusted and/or tuned to achieve a first combustion instability frequency 102, a second group of the combustors 14 may be adjusted and/or tuned to achieve a second combustion instability frequency 104, and a third group of the combustors 14 may be adjusted and/or tuned to achieve a third combustion instability frequency 106. The first, second, and third combustion instability frequencies 102, 104, 106 are different from one another and therefore at least slightly out-of-phase with one another. As a result, the combustion instability frequencies 102, 104, 106 associated with the combustors 14 cannot coherently or constructively interfere with one another, thereby reducing or preventing an increase in the combustion dynamics and/or reducing modal coupling that might otherwise drive sympathetic vibrations in the downstream turbine section 16.

The present disclosure provides several approaches for generating a different combustion instability frequency in one or more combustors, as compared with other combustors in the gas turbine array. The modifications of one or more axial distances, as described herein, may be used in one or a group of combustors, providing others of the combustors have axial distances that produce a different combustion instability frequency. The combustor array in a gas turbine may be configured in various groups, and it should be appreciated that the combustors of a given group need not be located adjacent one another or that the combustors of two or more different groups need not be positioned in any particular arrangement relative to one another.

One of ordinary skill in the art will readily appreciate from the teachings herein that the various structures described and illustrated with respect to FIGS. 1-11 may provide one or more methods for reducing combustion dynamics and/or reducing the coherence and, therefore, modal coupling of the combustion dynamics for two or more combustors 14. The methods may include, for example, flowing the working fluid 22 and fuel through one or more fuel nozzles 34, tubes 36, and/or tube bundles 62 into the combustion chambers 38 of multiple combustors The methods may further include modifications from one combustor to another combustor, such as varying the axial distances 76*a*, 76*b*, 76*c* between the fuel ports 74 and vanes 72 and the combustion chamber 38; varying the axial distance 96 between the fuel injectors 94 and the combustion chamber 38; and/or varying the axial lengths 80 of the cap assembly 50.

In particular embodiments, the method may include varying one or more of the axial distances 76*a*, 76*c* between the fuel ports 74 and the combustion chamber 38 and/or the axial distances 76*b* between the vanes 72 and the combustion chamber 38, as long as the axial distances 76*a*, 76*b*, 76*c* are not all the same between all of the combustors 14, to produce a combustion instability frequency in one combustor 14 (or group of combustors) that is different from the combustion instability frequency in another combustor 14 (or group of combustors).

In other particular embodiments, the method may include varying one or more of the axial distances 96 between the fuel injectors 94 and the combustion chamber 38, as long as the axial distances 96 are not all the same between all of the combustors 14, to produce a combustion instability frequency in one combustor 14 (or group of combustors) that is different from the combustion instability frequency in the other combustor 14 (or group of combustors).

In still further particular embodiments, the method may include varying one or more of the axial lengths 80 of the cap assembly 50, as long as the axial lengths 80 are not all the same between all combustors 14, to produce a combustion instability frequency in one combustor 14 that is different from the combustion instability frequency in the other combustor 14.

The various embodiments described and illustrated with respect to FIGS. 1-12 may provide one or more of the following advantages over existing combustors 14. Specifically, the different axial distances 76, 96 and/or axial lengths 80, alone or in various combinations, may decouple the combustion instabilities. As a result, the various embodiments described herein may enhance thermodynamic efficiency, promote flame stability, and/or reduce undesirable emissions over a wide range of operating levels.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for reducing modal coupling of combustion dynamics, the system comprising:
   (a) a plurality of combustors arranged in a circumferential array about a common longitudinal axis, each combustor having a liner defining a combustion chamber and a cap assembly having an axial cap length;
   (b) at least one fuel nozzle disposed within each combustor upstream of the combustion chamber, each of the at least one fuel nozzles being housed within the cap assembly and a first fuel nozzle of the at least one fuel nozzle comprising an axially extending center body, a shroud circumferentially surrounding at least a portion of the axially extending center body and a plurality of vanes extending radially between the center body and the shroud, the vanes being curved to impart swirl to a working fluid flowing between the shroud and the center body, each vane defining at least a first fuel port located at a first axial distance from a front end of the combustion chamber and further comprising an edge located at a second axial distance from the front end of the combustion chamber;
wherein at least one of the first axial distance and the second axial distance of the first fuel nozzle in a first combustor of the plurality of combustors is different from the first axial distance and the second axial distance of the first fuel nozzle in a second combustor of the plurality of combustors, and wherein the plurality of vanes of one of the fuel nozzles is located at an inlet of a corresponding shroud.

2. The system of claim 1, wherein the first axial distance of the first fuel nozzle in the first combustor is different from the first axial distance of the first fuel nozzle in the second combustor; and wherein the second axial distance of the first fuel nozzle in the first combustor is different from the second axial distance of the first fuel nozzle in the second combustor.

3. The system of claim 1, wherein the axially extending center body of the first fuel nozzle in each of the first combustor and the second combustor defines a fuel port located at a third axial distance from the front end of the combustion chamber.

4. The system of claim 3, wherein the third axial distance of the first fuel nozzle in the first combustor is different from the third axial distance of the first fuel nozzle in the second combustor.

5. The system of claim 4, wherein the first axial distance of the first fuel nozzle in the first combustor is different from the first axial distance of the first fuel nozzle in the second combustor; and wherein the third axial distance of the first fuel nozzle in the first combustor is different from the third axial distance of the first fuel nozzle in the second combustor.

6. The system of claim 4, wherein the axial cap length in the first combustor is different from the axial cap length in the second combustor.

7. The system of claim 6, wherein at least three of the first axial distance of the first fuel nozzle, the second axial distance of the first fuel nozzle, the third axial distance of the first fuel nozzle, and the axial cap length in the first combustor are different from the first axial distance of the first fuel nozzle, the second axial distance of the first fuel nozzle, the third axial distance of the first fuel nozzle, and the axial cap length in the second combustor.

8. The system of claim 1, wherein the cap assembly of each combustor further comprises a plurality of second fuel nozzles that circumferentially surround the first fuel nozzle, each second fuel nozzle comprising a plurality of tubes arranged in a tube bundle and each tube in the tube bundle comprising a fuel injector extending therethrough to provide fluid communication into each tube at a fourth axial distance from the front end of the combustion chamber.

9. The system of claim 8, wherein the fourth axial distance of the second fuel nozzles in the first combustor is different from the fourth axial distance of the second fuel nozzles in the second combustor.

10. A method of reducing modal coupling of combustion dynamics in a combustion system comprising a plurality of combustors, the method comprising:
   (a) providing a first combustor having a first liner defining a first combustion chamber, a first cap assembly, and at least one fuel nozzle housed within the first cap assembly, a first fuel nozzle of the at least one fuel nozzle comprising an axially extending center body, a shroud circumferentially surrounding at least a portion of the axially extending center body and a plurality of vanes extending radially between the center body and the shroud, the vanes being curved to impart swirl to a working fluid flowing between the shroud and the center body, each vane defining at least a first fuel port located at a first axial distance from a front end of the first combustion chamber and further comprising an edge located at a second axial distance from the front end of the first combustion chamber;
   (b) providing a second combustor having a second liner defining a second combustion chamber, a second cap assembly, and at least one fuel nozzle housed within the second cap assembly, a first fuel nozzle of the at least one fuel nozzle comprising an axially extending center body, a shroud circumferentially surrounding at least a portion of the axially extending center body and a plurality of vanes extending radially between the center body and the shroud, the vanes being curved to impart swirl to a working fluid flowing between the shroud and the center body, each vane defining at least a first fuel port located at a first axial distance from a front end of the second combustion chamber and further comprising an edge located at a second axial distance from the front end of the second combustion chamber;
wherein at least one of (i) the first axial distance of the first fuel nozzle in the first combustor is different from the first axial distance of the first fuel nozzle in the second combustor; and (ii) the second axial distance of the first fuel nozzle in the first combustor is different from the second axial distance of the first fuel nozzle in the second combustor, and wherein the plurality of vanes of one of the fuel nozzles is located at an inlet of a corresponding shroud.

11. The method of claim 10, further comprising: providing the axially extending center body of the first fuel nozzle of the first combustor and the second combustor with at least one fuel port, the fuel port being located at a third axial distance from the front end of the combustion chamber; wherein the third axial distance of the first fuel nozzle center body in the first combustor is different from the third axial distance of the first fuel nozzle center body in the second combustor.

12. The method of claim 11, further comprising: providing the first combustor with a first axial cap length and providing the second combustor with a second axial cap length, wherein the first axial cap length of the first combustor is different from the second axial cap length of the second combustor.

13. The method of claim 12, wherein at least three of the first axial distance of the first fuel nozzle, the second axial distance of the first fuel nozzle, the third axial distance of the first fuel nozzle, and the axial cap length in the first combustor are different from the first axial distance of the first fuel nozzle, the second axial distance of the first fuel nozzle, the third axial distance of the first fuel nozzle, and the axial cap length in the second combustor.

14. The method of claim 13, further comprising: providing the first fuel nozzle of the first combustor with the first axial distance, the second axial distance, the third axial distance, all of which are different from the first axial distance, the second axial distance, and the third axial distance of the first fuel nozzle of the second combustor, and wherein the axial cap length of the first combustor is different from the axial cap length of the second combustor.

15. The method of claim 10, further comprising: providing, in the first combustor and the second combustor, a plurality of second fuel nozzles that circumferentially surround the first fuel nozzle, each second fuel nozzle comprising a plurality of tubes arranged in a tube bundle and each tube in the tube bundle comprising a fuel injector extending therethrough to provide fluid communication into each tube at a fourth axial distance from the front end of the combustion chamber; wherein the fourth axial distance of the second fuel nozzles in the first combustor is different from the fourth axial distance of the second fuel nozzles in the second combustor.

* * * * *